United States Patent
Supahan et al.

(10) Patent No.: US 8,535,418 B2
(45) Date of Patent: Sep. 17, 2013

(54) GASEOUS BYPRODUCT REMOVAL FROM SYNTHESIS GAS

(75) Inventors: Asiff Apdul Supahan, Bangalore (IN); Ganesh Prasadh Kidambi, Nilgiris (IN); Rajalakshmi Vengadasamy, Kumbakonam (IN); Richard A. DePuy, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 178 days.

(21) Appl. No.: 12/951,397

(22) Filed: Nov. 22, 2010

(65) Prior Publication Data
US 2012/0124908 A1    May 24, 2012

(51) Int. Cl.
*B01D 53/14*    (2006.01)
(52) U.S. Cl.
USPC .................................. 95/149; 95/235; 95/236
(58) Field of Classification Search
None
See application file for complete search history.

(56) References Cited

U.S. PATENT DOCUMENTS

| | | | |
|---|---|---|---|
| 4,696,680 A | 9/1987 | Ghate et al. | |
| 7,158,434 B2 | 1/2007 | Hokenmaier | |
| 7,921,631 B2* | 4/2011 | Hedrick | 60/39.01 |
| 8,012,446 B1* | 9/2011 | Wright et al. | 423/437.1 |
| 8,137,655 B2* | 3/2012 | Chornet et al. | 423/654 |
| 2007/0006565 A1* | 1/2007 | Fleischer et al. | 60/39.5 |
| 2007/0256361 A1* | 11/2007 | Kindig | 48/197 R |
| 2009/0255181 A1* | 10/2009 | Rhinesmith et al. | 48/127.9 |
| 2009/0293723 A1 | 12/2009 | Steele | |
| 2011/0262328 A1* | 10/2011 | Wijmans et al. | 423/210 |

\* cited by examiner

*Primary Examiner* — Duane Smith
*Assistant Examiner* — Pankti Patel
(74) *Attorney, Agent, or Firm* — Armstrong Teasdale LLP

(57) ABSTRACT

A method of removing gaseous byproducts from a gas stream includes generating via at least one partial-combustion device a gas stream that includes gaseous byproducts. The method also includes channeling the gas stream from the at least one partial-combustion device to a fluid compression device that is configured to increase a pressure of the gas stream. The method further includes channeling the gas stream to a gaseous byproducts removal system to absorb at least a portion of the gaseous byproducts from the gas stream using a solvent. The method also includes discharging at least a portion of the gaseous byproducts from the gaseous byproducts removal system.

12 Claims, 4 Drawing Sheets

GASEOUS BYPRODUCT REMOVAL FROM SYNTHESIS GAS

BACKGROUND OF THE INVENTION

The present invention relates generally to removal systems, such as those used in gasification systems, and more particularly, to acid gas removal systems used in chemical plants producing chemicals from syngas generated by gasification and in integrated gasification combined-cycle (IGCC) power generation plants that combust syngas generated by gasification.

Most known IGCC plants include a gasification system that is integrated with at least one power-producing turbine system. Also, many known chemical production facilities include a similar gasification system. For example, at least some known gasification systems convert a mixture of fuel, air or oxygen and nitrogen, steam, water, and/or $CO_2$ into a synthesis gas, or "syngas." The syngas is channeled either to the combustor of a gas turbine engine, which powers an electrical generator that supplies electrical power to a power grid, or channeled to downstream reactors to produce chemicals. Exhaust from at least some known gas turbine engines is supplied to a heat recovery steam generator (HRSG) that generates steam for driving a steam turbine. Power generated by the steam turbine also drives an electrical generator that provides electrical power to the power grid.

At least some known gasification systems produce a "raw" syngas fuel that includes gaseous byproducts such as carbon monoxide (CO), hydrogen ($H_2$), carbon dioxide ($CO_2$), carbonyl sulfide (COS), and hydrogen sulfide ($H_2S$). The $H_2S$ and COS are typically referred to as acid gases. Moreover, the $CO_2$, $H_2S$, and COS, generated with the use of gasification technology, are generally removed from the raw syngas fuel to produce a "clean" syngas fuel for downstream process reactors or combustion within the gas turbine engines. Within known systems, such acid gas removal (AGR) is performed with an integrated $CO_2$/AGR system that removes a significant portion of the $CO_2$, $H_2S$, and COS with circulated refrigerated solvents. Sulfur collected by the AGR system is typically recovered by a sulfur recovery subsystem. $CO_2$ is disposed of by one of recycling to the gasifier, sequestration, and deposition.

Many known gasification systems include a gasifier that is operated at low pressures, i.e., within a pressure range of between approximately atmospheric [(101 kilopascal) (kPa) (14.7 pounds per square inch absolute (psia)] and approximately 4,137 kPa (600 psia). Gas generated within the gasifier is channeled to an integrated $CO_2$/AGR system within a pressure range of between approximately 2,068 kPa (300 psia) and approximately 3,447 kPa (500 psia). Many of these known gasification systems use a booster compressor downstream of the integrated $CO_2$/AGR system to channel the clean syngas fuel to the combustion turbines.

Capture and removal of $CO_2$, $H_2S$, and COS is a function of a pressure of the gases channeled within the integrated $CO_2$/AGR system and an amount of solvent circulated therein. Therefore, in many known low pressure gasification systems, improvements in an effectiveness and an efficiency of capture and removal of $CO_2$, $H_2S$, and COS from the raw syngas may be limited to increasing solvent flows and/or increasing gasification pressure. However, increasing solvent flows increases auxiliary power loads and associated operating costs. Moreover, increasing the operating pressure of the gasifier may result in an increase in costs of material used to fabricate the gasifier, for example, installation of high-end corrosion-resistant metals for cladding inside the gasifier to increase a tolerance of the gasifier to acidic environments at dew point conditions. Also, increasing the gasifier pressure may increase auxiliary power costs due to increased pressure requirements for channeling liquids and gases throughout the gasification process. In addition, such a retrofit to a higher pressure gasifier may not be available for gasification systems that are limited in operating pressure due to constraints in the feed system, as may be imposed by the use of lock hoppers.

BRIEF DESCRIPTION OF THE INVENTION

In one aspect, a method of removing gaseous byproducts from a gas stream is provided. The method includes generating via at least one partial-combustion device a gas stream that includes gaseous byproducts. The method also includes channeling the gas stream from the at least one partial-combustion device to a fluid compression device that is configured to increase a pressure of the gas stream. The method further includes channeling the gas stream to a gaseous byproducts removal system to absorb at least a portion of the gaseous byproducts from the gas stream using a solvent. The method also includes discharging at least a portion of the gaseous byproducts from the gaseous byproducts removal system.

In another aspect, a method of decreasing power consumption in a gasification facility is provided. The method includes coupling a gaseous byproducts removal system in flow communication with a gasification reactor that generates a gas stream that includes gaseous byproducts. The method also includes coupling a pressure step-up device in flow communication between the gasification reactor and the gaseous byproducts removal system. The method further includes channeling the gas stream from the gasification reactor to the pressure step-up device to facilitate increasing a pressure of the of the gas stream and to facilitate increasing a partial pressure of the gaseous byproducts.

In a further aspect, a gasification facility is provided. The gasification facility includes a carbonaceous fuel source. The facility also includes a reactant source. The method further includes a gasification reactor coupled in flow communication with the carbonaceous fuel source and the reactant source. The facility also includes at least one pressure step-up device coupled in flow communication downstream from the gasification reactor. The facility further includes a gaseous byproducts removal system coupled in flow communication downstream from the at least one pressure step-up device.

BRIEF DESCRIPTION OF THE DRAWINGS

The embodiments described herein may be better understood by referring to the following description in conjunction with the accompanying drawings.

DETAILED DESCRIPTION OF THE INVENTION

Figure 1:
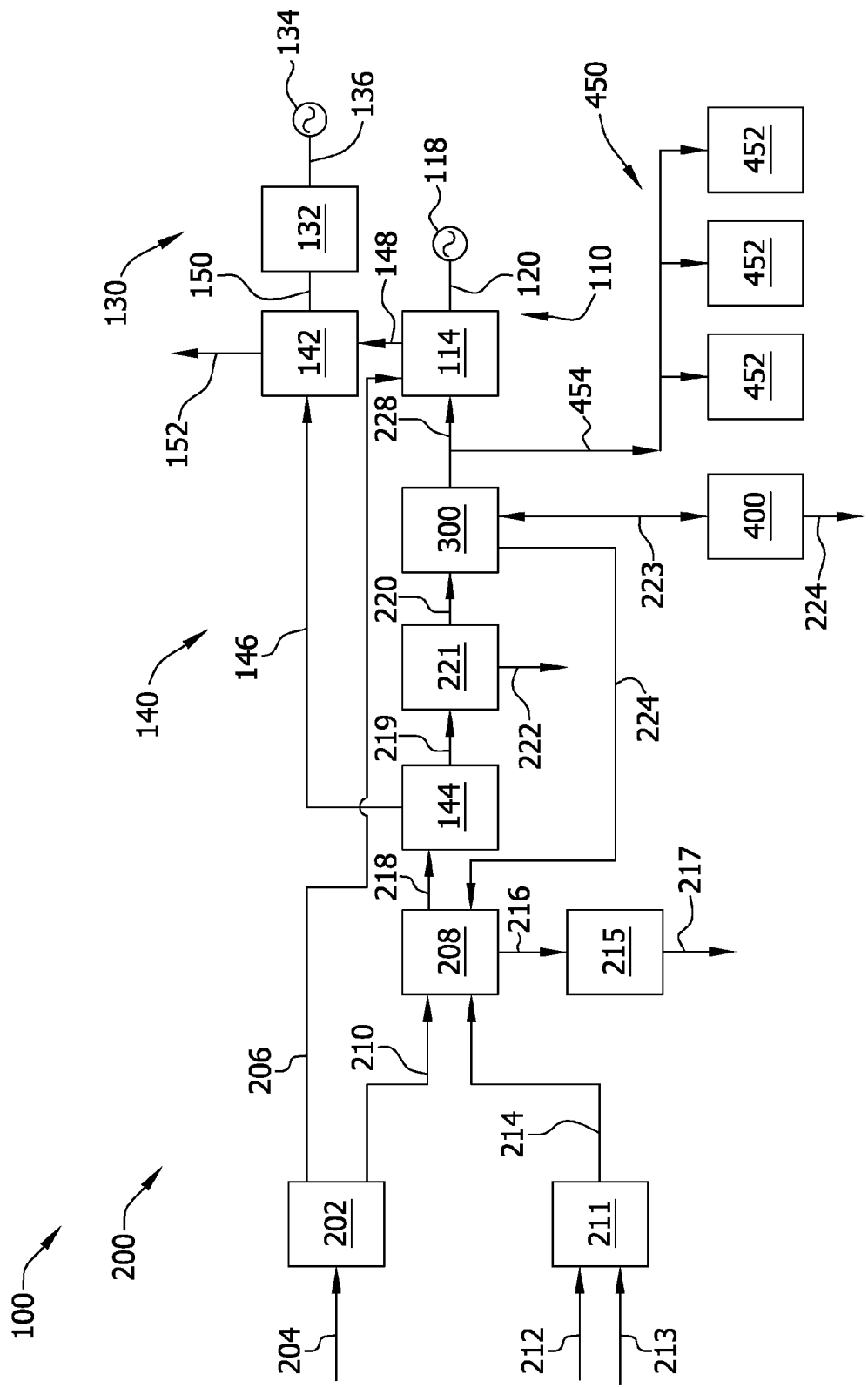
FIG. 1 is a schematic diagram of an exemplary integrated gasification combined-cycle (IGCC) power generation plant/chemical production plant.

FIG. 1 is a schematic diagram of an exemplary facility that uses an acid gas removal system, specifically, a gasification facility, and more specifically, is a schematic diagram of an exemplary integrated gasification combined-cycle (IGCC) power generation plant/chemical production plant 100, hereon referred to as IGCC/chemical plant 100. Alternatively, the methods and apparatus as described herein may be used with any facility in any suitable configuration including, without limitation, stand-alone combustion facilities and stand-alone chemical production facilities. It should be understood that IGCC/chemical plant 100 may contain numerous other elements than are shown.

In the exemplary embodiment, IGCC/chemical plant 100 includes a gas turbine engine assembly 110 that includes a gas turbine 114. Gas turbine 114 is rotatably coupled to a first electrical generator 118 via a first rotor 120. Gas turbine 114 is coupled in flow communication with at least one fuel source and at least one air source (neither shown) and is configured to receive fuel and air from the fuel and air sources, respectively. Gas turbine assembly 110 mixes air and fuel, produces hot combustion gases (not shown), and converts the heat energy within the combustion gases to rotational energy. The rotational energy is transmitted to first electrical generator 118 via first rotor 120, wherein first electrical generator 118 converts the rotational energy to electrical energy (not shown) for transmission to at least one load, such as, without limitation, an electrical power grid (not shown).

In the exemplary embodiment, IGCC/chemical plant 100 also includes a steam turbine engine assembly 130. In the exemplary embodiment, steam turbine engine assembly 130 includes a steam turbine 132 rotatably coupled to a second electrical generator 134 via a second rotor 136. In addition, IGCC/chemical plant 100 also includes a steam generation system 140. In the exemplary embodiment, steam generation system 140 includes at least one heat recovery steam generator (HRSG) 142 that is coupled in flow communication with at least one heat transfer apparatus 144 via at least one heated boiler feedwater conduit 146. HRSG 142 receives boiler feedwater (not shown) from heat transfer apparatus 144 via a conduit 146 to facilitate heating the boiler feedwater into steam. Additional steam can be generated in heat transfer apparatus 144 itself and then supplied to HRSG 142. HRSG 142 also receives exhaust gases (not shown) from gas turbine 114 via an exhaust gas conduit 148 to further heat the boiler feedwater into steam. HRSG 142 is coupled in flow communication with steam turbine 132 via a steam conduit 150. Combustion gases are exhausted from HRSG 142 to the atmosphere via a stack gas conduit 152.

Conduit 150 channels steam (not shown) from HRSG 142 to steam turbine 132. Steam turbine 132 receives the steam from HRSG 142 and converts the thermal energy in the steam to rotational energy. The rotational energy is transmitted to second electrical generator 134 via second rotor 136, wherein second electrical generator 134 converts the rotational energy to electrical energy (not shown) for transmission to at least one load, including, but not limited to, the electrical power grid. The steam is condensed and returned as boiler feedwater via a condensate conduit (not shown).

IGCC/chemical plant 100 also includes a gasification system 200. In the exemplary embodiment, gasification system 200 includes at least one oxygen source 202 that is coupled in flow communication with an air source (not shown) via an air conduit 204. Such air sources include, without limitation, dedicated air compressors, compressed air storage units, and atmospheric air. In at least some embodiments, oxygen source 202 is an air separation unit that separates oxygen from the other air constituents and channels substantially oxygen through gasification system 200. In such embodiments, an air separation unit is configured to separate air into oxygen ($O_2$), nitrogen ($N_2$) and other components (neither shown), wherein the $O_2$ channeled from oxygen source 202 is a reactant. The other components are retained in the gas stream. $N_2$ is either channeled to gas turbine 114 via $N_2$ conduit 206 to control combustion or vented to the atmosphere.

In other embodiments, oxygen source 202 is an enriched air facility that increases the partial pressure of oxygen as compared to the other constituents of air. In further embodiments, oxygen source 202 merely blows air through gasification system 100. Hereon, oxygen source 202 is described as delivering an oxygen stream, wherein the oxygen ($O_2$) stream may be in the form of substantially oxygen, oxygen-enriched air, or air.

Gasification system 200 includes a gasifier 208 that is coupled in flow communication with oxygen source 202 and that receives the reactant, i.e., the $O_2$ channeled from oxygen source 202 via an $O_2$ conduit 210. Gasification system 200 also includes a fuel supply unit 211. In the exemplary embodiment, fuel supply unit 211 is a coal grinding and slurrying unit. Fuel supply unit 211 is coupled in flow communication with a carbonaceous fuel source (not shown) that includes, without limitation, a coal source via a coal supply conduit 212. Fuel supply unit 211 is also coupled in flow communication with a water source (not shown) coupled in flow communication with a water supply conduit 213. Fuel supply unit 211 mixes the coal and water to form a coal fuel stream in the form of a coal slurry stream (not shown) that is channeled to gasifier 208 via a coal conduit 214. In alternative embodiments, fuel supply unit 211 is also coupled in flow communication with the carbonaceous fuel source via coal supply conduit 212, however, fuel supply unit 211 is a dry coal feeding unit and a coal carrier gas is used as a transport medium to channel the coal via coal conduit 214. Hereon, the term coal fuel stream is used to interchangeably describe either coal slurry or dry coal/carrier gas streams.

Gasifier 208 receives the coal fuel stream and the $O_2$ stream via conduits 214 and 210, respectively. Gasifier 208 includes sufficient injection devices and partial-combustion devices (neither shown) to mix and at least partially combust the injected coal fuel and $O_2$ streams therein. Gasifier 208 facilitates production of a hot, raw syngas stream (not shown). The raw syngas includes gaseous byproducts and impurities such as carbon monoxide (CO), hydrogen ($H_2$), carbon dioxide ($CO_2$), carbonyl sulfide (COS), and hydrogen sulfide ($H_2S$). While $CO_2$, COS, and $H_2S$ are typically collectively referred to as acid gases, or acid gas components of the raw syngas, hereon, $CO_2$ (and, to some extent, $H_2S$) will be discussed separately from the remaining acid gas components. Moreover, gasifier 208 also to produces a slag stream (not shown) composed of the ash from the coal, and further, lesser quantities of carbon, as a byproduct of the syngas production. The slag stream is channeled to a slag handling unit 215 via a hot slag stream conduit 216. Slag handling unit 215 quenches and breaks up the slag into small slag pieces wherein a slag removal stream (not shown) is produced and channeled through a slag conduit 217.

Gasifier 208 is coupled in flow communication with heat transfer apparatus 144 via a hot raw syngas conduit 218. Alternatively, a quenching unit including, without limitation, a water quenching unit, a gas quenching unit, or a chemical quenching unit may be used instead of heat transfer apparatus 144. Heat transfer apparatus 144 receives the hot, raw syngas stream and transfers at least a portion of the heat in the form of steam to steam turbine 132 via conduits 146 and 150. Subsequently, heat transfer apparatus 144 produces a cooled raw syngas stream (not shown) that is channeled to a scrubber and low temperature gas cooling (LTGC) unit 221 via a cooled raw syngas conduit 219. LTGC unit removes particulate matter entrained within the raw syngas stream and removes such particulate matter in a black water system (not shown) via a fly ash conduit 222. LTGC unit 221 further cools the raw syngas stream. Moreover, LTGC unit 221 converts at least a portion of COS in the raw syngas stream to $H_2S$ and $CO_2$ via hydrolysis.

Gasification system 200 also includes a gaseous byproducts removal system, i.e., an acid gas removal (AGR) system 300 that is coupled in flow communication with LTGC unit 221 and that receives the cooled raw syngas stream via raw syngas conduit 220. AGR system 300 also facilitates removal of at least a portion of sulfur-containing components, in particular $H_2S$ (not shown), from the raw syngas stream via refrigerated chemical and physical solvents (not shown), such as, without limitation, amines and dimethyl ethers of polyethylene glycol (DEPG), directly contacting the raw syngas. AGR system 300 facilitates the removal of $CO_2$ from the synthesis gas via direct contact of the raw syngas with the solvents. In the exemplary embodiment, a $CO_2$ conduit 224 is coupled in flow communication with gasifier 208 to facilitate gasification. Alternatively, conduit 224 is coupled in flow communication with any other system that enables operation of system 200 as described herein including, without limitation, a sequestration system. Moreover, in some embodiments, AGR system 300 is coupled in flow communication with a sulfur reduction system 400 via a conduit 223 to treat the $H_2S$ removed from the syngas in AGR system 300 and convert it to elemental sulfur (not shown). It should be understood that LTGC unit 221 is not a necessary precursor to the proposed process, i.e., alternatively, various high temperature acid gas removal schemes may operate without LTGC unit 221 or LTGC unit 221 may follow the acid gas removal.

In operation, oxygen source 202 channels $O_2$ to gasifier 208 via $O_2$ conduit 210. Also, in operation, fuel supply unit 211 receives dry coal and water or carrier gas via conduits 212 and 213, respectively, forms a coal fuel stream and channels the coal fuel stream to gasifier 208 via coal conduit 214.

Gasifier 208 receives the $O_2$ via $O_2$ conduit 210, and coal via coal conduit 214. Gasifier 208 facilitates production of a hot raw syngas stream that is channeled to heat transfer apparatus 144 via hot syngas conduit 218. The slag byproduct that is formed in gasifier 208 is removed via slag handling unit 215 and conduits 216 and 217. Heat transfer apparatus 144 facilitates cooling the hot raw syngas stream to produce a cooled raw syngas stream that is channeled to scrubber and LTGC unit 221 via conduit 219 wherein particulate matter is removed from the syngas via fly ash conduit 222, the syngas is cooled further, and at least a portion of COS is converted to $H_2S$ and $CO_2$ via hydrolysis. The cool raw syngas stream is channeled to AGR system 300 wherein acid gas components are substantially removed such that a clean syngas stream is formed and channeled to gas turbine 114 via clean syngas stream conduit 228 and at least a portion of the $CO_2$ is channeled from AGR system 300 via conduit 224.

Further, during operation, gas turbine 114 receives $N_2$ and clean syngas via conduits 206 and 228, respectively. Gas turbine 114 combusts the syngas fuel, produces hot combustion gases and channels the hot combustion gases to induce rotation of gas turbine 114 which subsequently rotates first electrical generator 118 via first rotor 120. In some embodiments, at least some of the CO and $H_2$ produced by gasification reactor 208 and included in the syngas is removed and channeled to a methanation system (not shown).

At least a portion of heat removed from the hot syngas via heat transfer apparatus 144 and LTGC unit 221 is channeled as steam to HRSG 142 via conduit 146 wherein the heat superheats the steam. The steam is channeled to steam turbine 132 via steam conduit 150 and induces a rotation of steam turbine 132. Turbine 132 rotates second electrical generator 134.

IGCC/chemical plant 100 also includes a chemical production plant 450. In the exemplary embodiment, chemical production plant 450 includes at least one chemical production reactor 452 via a clean syngas conduit 454. Chemical production plant 450 produces any chemicals and chemical compounds including, without limitation, substitute natural gas (SNG), methanol and derivates thereof, elemental hydrogen, urea, ammonia, Fisher-Tropsch liquids, and acetic acid.

Figure 2:
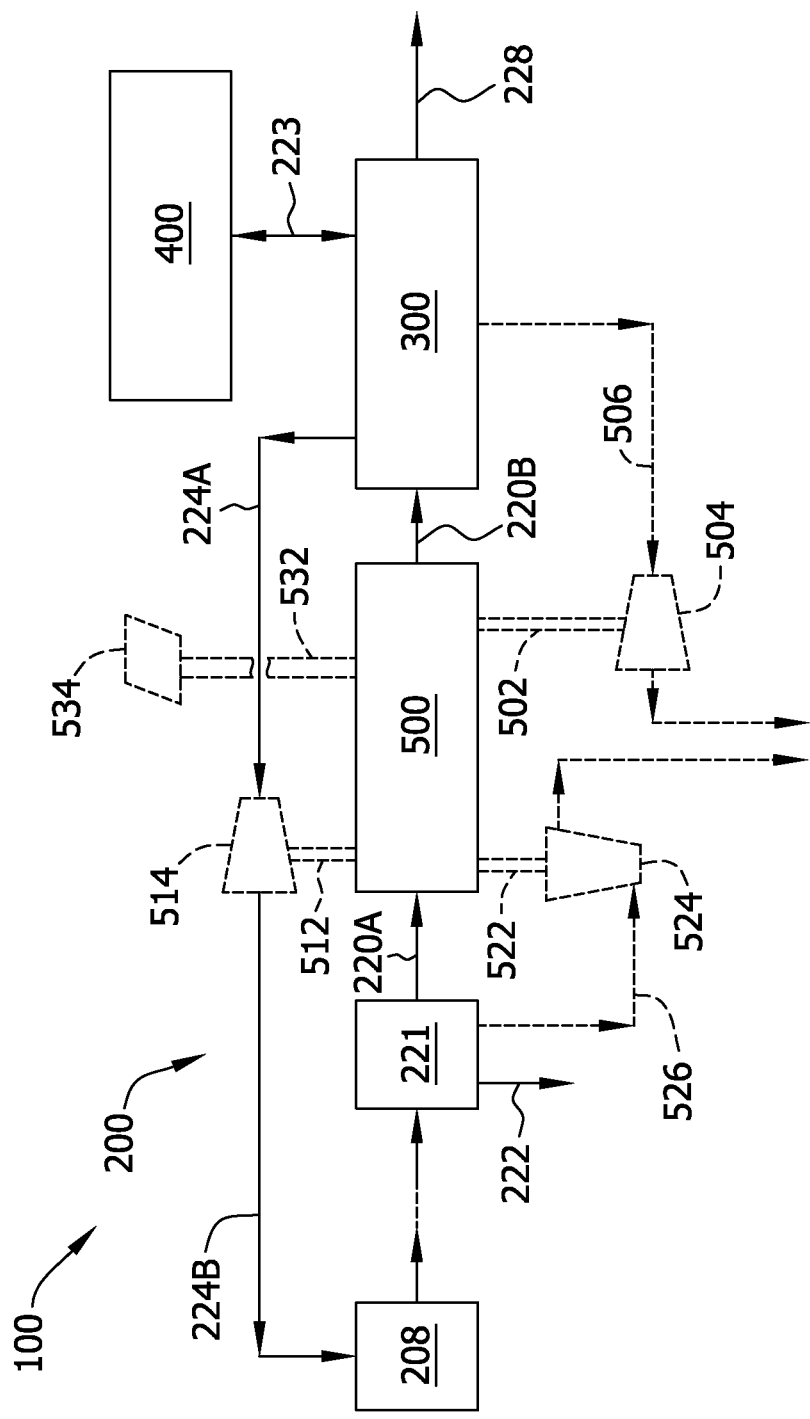
FIG. 2 is a schematic diagram of a portion of a gasification system that may be used with the IGCC power generation plant/chemical production plant shown in FIG. 1 and an exemplary booster pump coupled therein.

FIG. 2 is a schematic diagram of a portion of gasification system 200 and an exemplary booster compressor 500 coupled therein. Booster compressor 500 is coupled in flow communication with LTGC unit 221 via a booster compressor inlet conduit 220A. Also, booster compressor 500 is coupled in flow communication with acid gas removal system 300 via a booster compressor outlet conduit 220B. In the exemplary embodiment, booster compressor 500 is a pressure step-up/fluid compression device that increases a pressure of the cooled raw syngas stream (not shown) channeled from scrubber and LTGC unit 221 to acid gas removal system 300.

In the exemplary embodiment, gasification reactor 208 generates the hot raw syngas stream (not shown) in a pressure range of between approximately 101 kilopascal (kPa) (14.7 pounds per square inch absolute (psia)) and approximately 4,137 kPa (600 psia). The hot raw syngas stream is channeled to LTGC unit 221. Further, in the exemplary embodiment, LTGC unit 221 generates the cooled raw syngas stream and channels the stream to booster compressor 500 in a pressure range of between approximately 2,068 kPa (300 psia) and approximately 3,447 kPa (500 psia). Moreover, in the exemplary embodiment, the cooled raw syngas stream is stepped-up in pressure by booster compressor 500 from a pressure range of between approximately 2,068 kPa (300 psia) and approximately 3,103 kPa (450 psia) to a pressure range of approximately 5,861 kPa (850 psia) to approximately 6,895 kPa (1000 psi). The pressurized gas stream is channeled to AGR system 300 and the gaseous byproducts contact the solvent in AGR system 300 while the gaseous byproducts within the gas stream are within a pressure range of approximately 5,861 kPa (850 psia) to approximately 6,895 kPa (1000 psi). Alternatively, any pressure ranges in any portion of gasification system 200 that enables operation of gasification system 200 and IGCC/chemical plant 100 as described herein may be used.

In the exemplary embodiment, increasing the pressure of the cooled raw syngas, prior to it being channeled into AGR system 300, facilitates increasing a partial pressure of the gaseous byproducts desired to be removed from the syngas, for example, without limitation, of $CO_2$ and $H_2S$. Increasing the partial pressure of $CO_2$ and $H_2S$ facilitates absorption of these gases by physical contact with the solvent. Therefore, for a given concentration of $CO_2$ and $H_2S$ in the syngas, less solvent may be circulated within AGR system 300 to remove those gaseous byproducts, and electrical power used to circulate the solvent may be reduced, thereby reducing auxiliary power usage associated with circulating the solvent by between approximately 10% to 15%. Reducing auxiliary power usage facilitates reducing operational costs associated with IGCC/chemical plant 100 and gasification system 200, and increasing operating efficiencies thereof. Such reductions in auxiliary power usage may also be attained in gasification facilities other than IGCCs, such as, without limitation, chemical facilities that include methanation and urea plants/systems that generate a sweet syngas with little to no $CO_2$ therein.

Moreover, in the exemplary embodiment, in gasification system 200, further compression of $CO_2$ downstream of AGR system 300 is facilitated to be reduced and, in some embodiments, may be eliminated, thereby facilitating a further reduction in auxiliary power usage. Further, in the exemplary embodiment, use of auxiliary power to drive electric motor-driven regeneration refrigerant compressors is reduced by between approximately 40% to 45%. Also, lean solvent inventories may be reduced, thereby reducing operational costs associated with inventory maintenance and management. Furthermore, in the exemplary embodiment, additional compression of clean syngas (not shown) from AGR system 300 to downstream devices and systems that include, without limitation, gas turbine engine 114 (shown in FIG. 1) and/or a methanation system (not shown) is reduced, thereby facilitating an additional reduction in auxiliary power usage.

In some embodiments, at least one of a plurality of devices may be employed to drive booster compressor 500. For example, in at least one embodiment, booster compressor 500 is driven by a prime mover 502 rotatably coupled to a turbine expander 504 coupled in flow communication with AGR system 300. In such an embodiment, a pressurized gaseous byproduct-rich solvent (not shown) is channeled from AGR system 300 to turbine expander 504 via a conduit 506. The pressurized gaseous byproduct-rich solvent is reduced in pressure and expanded, thereby driving turbine expander 504 and, in turn, driving prime mover 502.

In another embodiment, booster compressor 500 is driven by a prime mover 512 that is rotatably coupled to a turbine expander 514 that is coupled in flow communication with AGR system 300. In this embodiment, a pressurized $CO_2$ stream (not shown) is channeled from AGR system 300 to turbine expander 514 via a conduit 516. The pressurized $CO_2$ stream is reduced in pressure and expanded, thereby driving turbine expander 514 that, in turn, drives prime mover 512.

In a further embodiment, booster compressor 500 is driven by a prime mover 522 that is rotatably coupled to a steam turbine 524 that is coupled in flow communication with LTGC unit 221. In such an embodiment, pressurized steam (not shown) generated within LTGC unit 221 is channeled from LTGC unit 221 to steam turbine 524 via a conduit 526. The pressurized steam is reduced in pressure and expanded, thereby driving steam turbine 524 and, in turn, driving prime mover 522. Alternatively, steam generated from any source including, without limitation, a methanation system, gas shift devices/reactors, HRSG 142, and auxiliary boilers that enables operation of booster compressor 500 as described herein.

In these embodiments, thermal energy and/or potential energy, i.e., pressure, in fluids that would otherwise not be captured is used to drive booster compressor 500, thereby further facilitating a reduction in auxiliary power usage and increasing an operating efficiency of IGCC/chemical plant 100 and gasification system 200, thereby facilitating a reduction of associated operating costs.

In one embodiment, booster compressor 500 is driven by a prime mover 532 that is rotatably coupled to an electrical drive device 534. In such an embodiment, electrical drive device 534 may include, without limitation, a constant speed motor and a variable speed drive (VSD) unit. In such embodiment, a reduction in use of auxiliary power may be attained by using a VSD unit, wherein the VSD unit is programmed to use only an amount of auxiliary power needed for the existing loading of booster compressor 500. Also, in this embodiment, a constant speed motor with commercially available efficiency features will also reduce auxiliary power used to drive booster compressor 500. In such embodiments, an increase in auxiliary power usage is more than offset by the reduction in auxiliary power usage associated with reductions in electrical power used to circulate solvent, to drive electric motor-driven regeneration refrigerant compressors, to further compress $CO_2$ downstream of AGR system 300, and/or to further compress clean syngas channeled from AGR system 300.

In the exemplary embodiments of gasification system 200, booster compressor 500 positioned upstream of AGR system 300 within gasification system 200 facilitates improved capture and removal of $CO_2$, $H_2S$, and COS over that of known gasification systems that use a booster compressor downstream of the associated $CO_2$/AGR systems. Capture and removal of $CO_2$, $H_2S$, and COS is at least partially a function of a pressure of the gases channeled to AGR system 300 and an amount of solvent circulated therein. Therefore, in the exemplary embodiments of gasification system 200 a partial pressure of the $CO_2$, $H_2S$, and COS is increased due to the increased pressure of the raw syngas stream channeled to AGR system 300 via booster compressor outlet conduit 220B. An improved effectiveness and efficiency of capture and removal of $CO_2$, $H_2S$, and COS due to the increased pressure facilitates a reduction of solvent flows through AGR system 300 to remove the $CO_2$, $H_2S$, and COS from the raw syngas stream. The improved effectiveness and efficiency of capture and removal of $CO_2$, $H_2S$, and COS does not require significant and costly material upgrades to gasification reactor 208, and therefore facilitates retrofits of existing facilities. Moreover, decreasing solvent flows decreases auxiliary power loads and associated operating costs.

Figure 3:
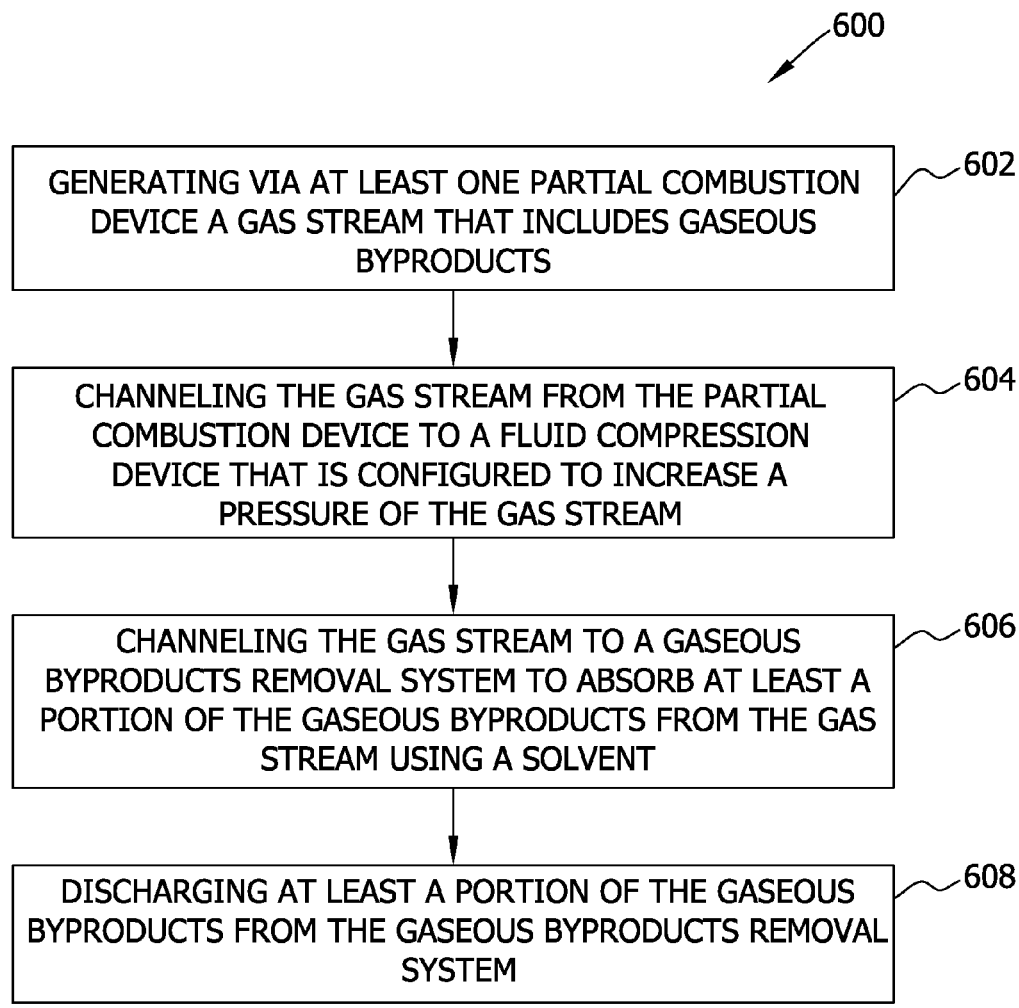
FIG. 3 is a flow diagram of an exemplary method that may be used to remove gaseous byproducts from a gas stream used with the gasification system shown in FIG. 2.

FIG. 3 is a flow diagram of an exemplary method 600 for use in removing gaseous byproducts from a gas stream that may be used with gasification system 200 (shown in FIG. 2). In the exemplary embodiment, a gas stream that includes gaseous byproducts is generated 602 via at least one partial-combustion device, such as, gasification reactor 208 (shown in FIGS. 1 and 2). Also, in the exemplary embodiment, the gas stream is channeled 604 from gasification reactor 208 to a fluid compression device, such as, booster compressor 500 (shown in FIG. 2), that increases a pressure of the gas stream. Further, in the exemplary embodiment, the gas stream is channeled 606 to a gaseous byproducts removal system, such as, AGR system 300 (shown in FIGS. 1 and 2) to absorb at least a portion of the gaseous byproducts from the gas stream using a solvent. Moreover, in the exemplary embodiment, at least a portion of the gaseous byproducts are discharged 608 from AGR system 300.

Figure 4:
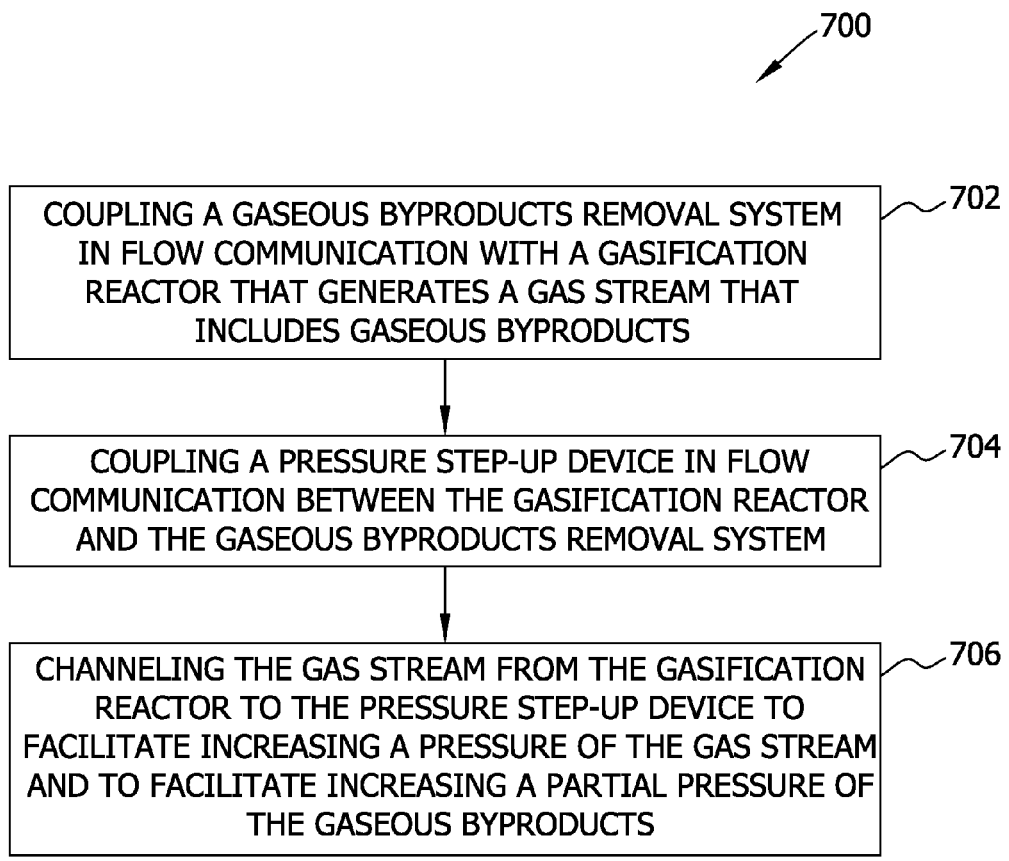
FIG. 4 is a flow diagram of an exemplary method of decreasing power consumption in a gasification facility such as the IGCC power generation plant/chemical production plant shown in FIG. 1.

FIG. 4 is a flow diagram of an exemplary method 700 for use in decreasing power consumption in IGCC power generation plant/chemical production plant 100 (shown in FIG. 1). In the exemplary embodiment, a gaseous byproducts removal system, such as, AGR system 300 (shown in FIGS. 1 and 2) is coupled 702 in flow communication with gasification reactor 208 (shown in FIGS. 1 and 2) that generates a gas stream that includes gaseous byproducts. Also, in the exemplary embodiment, a pressure step-up device, such as booster compressor 500, is coupled 704 in flow communication between gasification reactor 208 and AGR system 300. Further, in the exemplary embodiment, the gas stream is channeled 706 from gasification reactor 208 to booster compressor 500 to facilitate increasing a pressure of the gas stream and to facilitate increasing a partial pressure of the gaseous byproducts.

Embodiments provided herein facilitate the operation of gasification facility by increasing a pressure of syngas produced in a gasification reactor with undesired gaseous byproducts that are channeled to acid gas removal (AGR) systems. Increasing the syngas pressure facilitates increase in the partial pressure of the gaseous byproducts in the syngas, and facilitates reducing auxiliary power usage for a given syngas output. Reducing auxiliary power usage facilitates increasing an operating efficiency of the gasification facility, and thus reduces associated operating and production costs. An overall reduction of auxiliary power usage by the gasification facility in the range of 20% to 30% may be realized.

Described herein are exemplary embodiments of methods and apparatus that facilitate operation of gasification facilities. Specifically, positioning a booster compressor prior to an AGR system facilitates increasing a pressure of syngas produced in a gasification reactor with undesired gaseous byproducts. More specifically, the booster compressor increases the partial pressure of the gaseous byproducts for more effective and efficient removal upon contact with solvent in the AGR system. Also, more specifically, the more efficient operation of the AGR system facilitates a reduction in auxiliary power usage associated with reductions in electrical power used to circulate solvent, to drive electric motor-driven regeneration refrigerant compressors, to further compress $CO_2$, CO, and $H_2$ downstream of the AGR system, and/or to further compress clean syngas channeled from the AGR system. Such reductions in auxiliary power usage facilitate an increase of an operating efficiency of the gasification facility, thereby reducing associated operating and production costs.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other systems, facilities, and methods.

While the invention has been described in terms of various specific embodiments, those skilled in the art will recognize that the invention can be practiced with modification within the spirit and scope of the claims.

What is claimed is:

1. A method of removing gaseous byproducts from a gas stream, said method comprising:
    generating via at least one partial-combustion device a gas stream that includes gaseous byproducts;
    channeling the gas stream from the at least one partial-combustion device to a fluid compression device that is coupled between a gaseous byproducts removal system and the at least one partial-combustion device, wherein the fluid compression device facilitates increasing a pressure of the gas stream from a pressure range between approximately 2,068 kPa (300 psia) and approximately 3,447 kPa (500 psia) to a pressure range between approximately 5,861 kPa (850 psia) and approximately 6,895 kPa (1000 psi);
    channeling the gas stream to the gaseous byproducts removal system to absorb at least a portion of the gaseous byproducts from the gas stream using a solvent, wherein increasing the pressure of the gas stream facilitates increasing the absorption of the gaseous byproducts by the solvent and facilitates reducing an amount of solvent required and reducing an amount of power required to circulate the solvent through the gaseous byproducts removal system; and
    discharging at least a portion of the gaseous byproducts from the gaseous byproducts removal system.

2. A method in accordance with claim 1, wherein generating a gas stream that includes gaseous byproducts comprises generating a gas stream that includes at least one of carbon dioxide ($CO_2$), carbonyl sulfide (COS), hydrogen sulfide ($H_2S$), and mixtures thereof.

3. A method in accordance with claim 1, wherein channeling the gas stream from the at least one partial-combustion device to a fluid compression device comprises increasing a partial pressure of the gaseous byproducts in the gas stream.

4. A method in accordance with claim 3, wherein channeling the gas stream to a gaseous byproducts removal system comprises contacting the gaseous byproducts discharged from the fluid compression device with the solvent.

5. A method in accordance with claim 4, wherein increasing a partial pressure of the gaseous byproducts in the gas stream comprises facilitating an increase in gaseous byproducts removal from the gas stream as a function of the increase in partial pressure of the gaseous byproducts.

6. A method in accordance with claim 1, wherein channeling the gas stream from the at least one combustion device to a fluid compression device comprises one of:
    driving the fluid compression device with a fluid-driven prime mover; and
    driving the fluid compression device with an electrical drive device.

7. A method of removing gaseous byproducts from a gas stream, said method comprising:
    generating via at least one partial-combustion device a gas stream that includes gaseous byproducts;
    channeling the gas stream from the at least one partial-combustion device to a fluid compression device that is coupled between a gaseous byproducts removal system and the at least one partial-combustion device, wherein the fluid compression device facilitates increasing a pressure of the gas stream;
    channeling the gas stream to the gaseous byproducts removal system to absorb at least a portion of the gaseous byproducts from the gas stream using a solvent, wherein increasing the pressure of the gas stream facilitates increasing the absorption of the gaseous byproducts by the solvent and facilitates reducing an amount of solvent required and reducing an amount of power required to circulate the solvent through the gaseous byproducts removal system, wherein channeling the gas stream to the gaseous byproducts removal system comprises contacting the gaseous byproducts with the solvent within a pressure range between approximately 5,861 kPa (850 psia) to approximately 6,895 kPa (1000 psi); and
    discharging at least a portion of the gaseous byproducts from the gaseous byproducts removal system.

8. A method in accordance with claim 1, wherein generating a gas stream comprises generating a gas stream at a pressure between approximately 101 kilopascal (kPa) (14.7 pounds per square inch absolute (psia)) and approximately 4,137 kPa (600 psia).

9. A method in accordance with claim 7, wherein generating a gas stream that includes gaseous byproducts comprises generating a gas stream that includes at least one of carbon dioxide ($CO_2$), carbonyl sulfide (COS), hydrogen sulfide ($H_2S$), and mixtures thereof.

10. A method in accordance with claim 7, wherein channeling the gas stream from the at least one partial-combustion device to a fluid compression device comprises increasing a partial pressure of the gaseous byproducts in the gas stream.

11. A method in accordance with claim 7, wherein channeling the gas stream from the at least one combustion device to a fluid compression device comprises one of:
   driving the fluid compression device with a fluid-driven prime mover; and
   driving the fluid compression device with an electrical drive device.

12. A method in accordance with claim 7, wherein generating a gas stream comprises generating a gas stream at a pressure between approximately 101 kilopascal (kPa) (14.7 pounds per square inch absolute (psia)) and approximately 4,137 kPa (600 psia).

* * * * *